United States Patent

[11] 3,587,369

| [72] | Inventors | Franz Reiners<br>Berg, Erkelenz-Land;<br>Georg Walk, Rheydt, Germany |
|---|---|---|
| [21] | Appl. No. | 724,520 |
| [22] | Filed | Apr. 26, 1968 |
| [45] | Patented | June 28, 1971 |
| [73] | Assignee | A. Monforts, Monchengladbach, Germany |
| [32] | Priority | Apr. 29, 1967 |
| [33] | | Germany |
| [31] | | M73796IB/49a |

[54] ROTARY MACHINE TOOL
1 Claim, 6 Drawing Figs.

[52] U.S. Cl. .................................................. 82/2.5, 29/38
[51] Int. Cl. ...................................................... B23b 13/02
[50] Field of Search ........................................... 82/2.5, 2.7, 3; 29/38, 35.5, 36

[56] References Cited
UNITED STATES PATENTS
3,283,625  11/1966  Smith .......................... 82/3
FOREIGN PATENTS
500,498  12/1919  France ........................ 29/38
1,156,292  10/1963  Germany ..................... 82/2.5

*Primary Examiner*—Leonidas Vlachos
*Attorneys*—Curt M. Avery, Arthur E. Wilfond, Herbert L. Lerner and Daniel J. Tick

ABSTRACT: Rotary machine tool includes a rotary spindle mounted in a machine frame and a movable support mounted on the frame and carrying at least two clamping devices. The support is adjustable in a direction transverse to the operating spindle to at least two positions wherein one of the clamping devices is connectable to the operating spindle for rotating therewith and the other of the clamping devices is accessible for alternately clamping therein a workpiece to be machined and removing therefrom a workpiece already machined.

PATENTED JUN 28 1971 3,587,369

ROTARY MACHINE TOOL

Our invention relates to a rotary machine tool, and more particularly to such tool wherein the workpiece is clamped during the machining thereof in a clamping device such as chuck, mandrel or the like driven by the operating spindle of the machine tool, while the tool members, such as turning and boring tools and the like, preferably clamped on a tool revolver or turret, are displaceable against the workpiece.

Specifically, the invention is of value for revolver or turret-type rotary machine tools wherein the operating spindle, which is provided with a chuck, for example, and the shaft for a tool revolver are preferably located parallel to and above one another in a block-type machine frame, the tool revolver being both axially displaceable as well as pivotable into a plurality of operating positions wherein the revolver can be fixed. Such revolver or turret-type machine tools have been heretofore produced in great number by the assignee of the instant invention. They are often furnished with loading and unloading devices such as for example a built-in lifting mechanism, to permit mounting of heavy workpieces in the chuck and removal of such workpieces therefrom. In other revolver or turret-type rotary machine tools produced by the assignee of the instant application, magazines for smaller unmachined workpieces are disposed close to and inclined with respect to the chuck. From such magazine, after removal of each respective finished or already machined workpiece, a new unmachined workpiece can be inserted over the shortest distance into the chuck.

While the hereinbefore mentioned lifting mechanisms have great spatial dimensions and the loading and unloading processes are difficult and time-consuming, the hereinbefore mentioned magazines have the disadvantage that they reduce the accessibility of the workpiece being machined, particularly when a multiarmed tool revolver or turret is located adjacent the workpiece being machined. Both loading and unloading devices can also be serviced after a workpiece has been machined. Thus, loading and unloading interrupts production, which has an undesirable effect on the quantity of parts machinable in a particular period for relatively large workpieces.

It is accordingly an object of our invention to provide rotary machine tool which avoids the disadvantages of the aforementioned heretofore known machine tools of this general type. More particularly, it is an object of our invention to provide such machine tool which will permit loading and unloading during the machining of the workpiece clamped in the clutch.

With the foregoing and other objects in view we accordingly provide a rotary machine tool of the aforementioned type with at least two exchangeable chucks. Whereas the clamping of a relatively large workpiece in a chuck is complicated and time-consuming, the mere exchange operation of two loaded clutches results in only a very short interruption of the time necessary for the machining. Servicing personnel can therefore supervise several rotary machine tools, and the production output is thereby increased. It is of particular advantage that a considerably better scheduling of time is possible for utilizing the activities of the servicing personnel because the preparations for loading and unloading lend themselves favorably for being fitted into relatively long operating schedules.

More specifically, in accordance with the invention we provide a rotary machine tool with at least two clamping devices, such as chucks and the like, which are displaceable transversely to the operating spindle and individually connectable to the operating spindle. The chuck coupled to the operating spindle cooperates with a tool member for machining a workpiece clamped in the respective chuck, while the other chuck or chucks are located in a position accessible for loading and unloading a nonmachined or a finished workpiece. The other chuck or chucks are not operatively connected with the operating spindle.

In accordance with a further feature of the invention, the chucks are mounted on a special support in an invariable spacing from one another, the support being displaceable with respect to the machine frame so that each of the chucks is able to be coupled individually to the operating spindle.

In accordance with a still further feature of the invention, the chucks and similar clamping devices can be mounted on a slide displaceable relative to the machine frame and can be displaced therewith in rectilinear direction transverse to the operating spindle.

In accordance with yet another feature of the invention, the chucks can be displaceable radially in an arc or by means of a rotary support member to and from the operating spindle.

If at least three chucks are provided on the displaceable support member, one of the chucks is respectively coupled to the operating spindle, and a workpiece clamped in the one chuck can be machined, i.e. turned for example; a second chuck is located offside from the operating spindle, preferably at a working level desirable for the operator or other servicing personnel and accessible to them for loading therein or unloading therefrom a workpiece; a third and other chucks can be loaded with workpieces at other locations. For such an arrangement of displaceable chucks, in accordance with another feature of the invention, a rotary turret mounted on the machine frame is particularly well suited. The rotary turret for the chucks must obviously be so constructed that each chuck is individually capable of being coupled to the operating spindle.

In accordance with a further feature of the rotary machine tool of the invention in the instant application, one of the chucks is driven whereas the other chucks remain stationary. Also, during the machining or material removing operation, the machine tool of the invention can be so loaded with several raw workpieces that a short displacement operation and the servicing of the coupling effected at the operating spindle constitute the only inoperative time periods of the machine tool during production. On the other hand, with the heretofore known rotary machine tools having only one chuck firmly connected to the operating spindle, the time spent for loading and unloading the chuck was many times greater than that now necessary for interrupting the production period proper with the machine tool of this invention.

Other features which are considered as characteristic for the invention are set forth in the appended claims.

Although the invention is illustrated and described herein as embodied in rotary machine tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings wherein.

Figure 1:
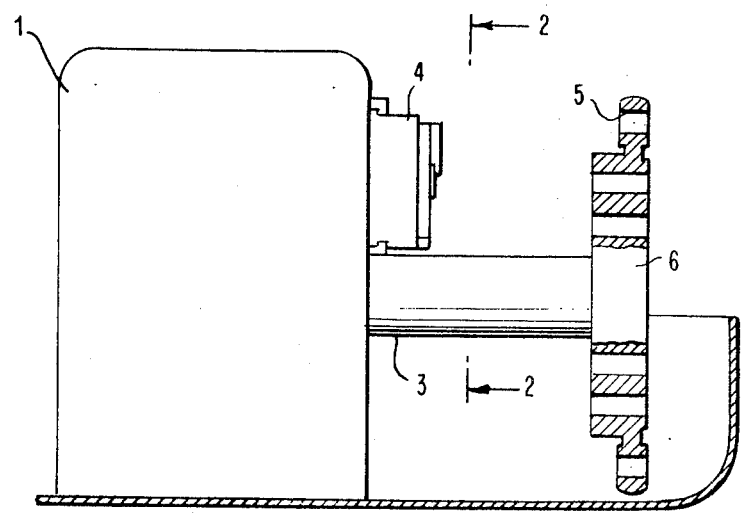
FIG. 1 is a side elevational view, partly in section, of a rotary machine tool having a displaceable support member for a pair of chucks.
Figure 2:
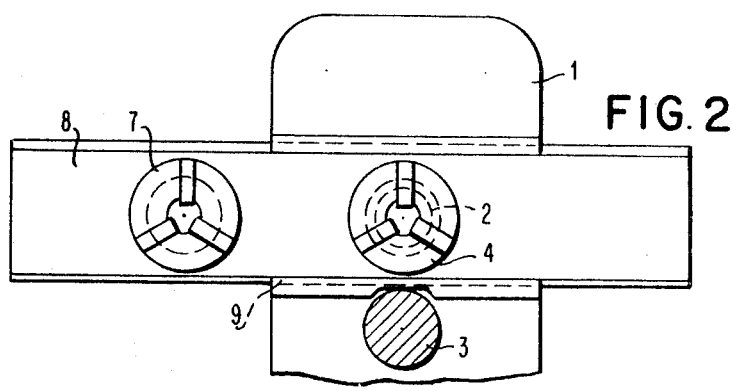
FIG. 2 is a front elevational view of FIG. 1, partly broken away and partly in section, taken along the line 2—2 of FIG. 1.
Figure 4:
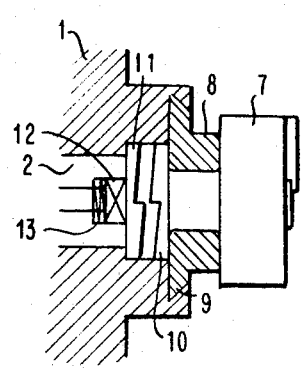
FIGS. 3 and 4 are fragmentary sectional views through the machine frame of FIG. 1 showing the operating spindle respectively disengaged from and in clutching engagement with a chuck.
Figure 3:
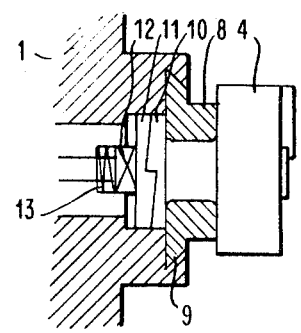

Referring now to the drawings, and first particularly to FIGS. 1 and 2 thereof, there is shown a rotary machine tool having a block-type machine frame 1 wherein an operating spindle 2 is mounted above and parallel to a tool-revolver shaft 3. The operating spindle 2 carries a chuck 4 which is adapted to clamp a nonillustrated workpiece in the jaws thereof so that a machining operation may be performed on the workpiece. The revolver shaft 3 is axially displaceable and is pivotable into several operating positions and able to be fixed in those positions by means of nonillustrated index pins or bolts seated on the machine frame and extending, during machining of the workpiece, into respective bores 5 formed at appropriate locations registrable with the index pins of a star-shaped or cross-shaped revolver 6 equipped with operating tool members (not shown). For further details regarding such revolvers reference can be had to copending application Ser. No. 713,723, filed Mar. 18, 1968, of which we are coinventors. The chuck 4 as well as an additional chuck 7 are rotatably mounted in a sliding support 8 which is displaceable by means of dovetailed guide 9 in the machine frame of block 1 (FIGS. 3 and 4). The chuck 7, shown at the left-hand side of FIG. 3 is not coupled to the operating spindle 2 and is therefore stationary, i.e. not rotating. An as yet raw or nonmachined workpiece can thus by clamped in the chuck 7, or a finished workpiece previously machined can be removed from the chuck 7, while the chuck 4 shown in the center of the machine in FIG. 2 is coupled with the operating spindle 2, as shown in FIG. 3 of the drawing, and is being rotated thereby.

The clutch shown in FIGS. 3 and 4 is diagrammatic and simplified. It is formed of two clutch discs 10 and 11, one of which is rigidly seated on the chuck whereas the other engages in a recess formed in the operating spindle 2. The entrainment of the clutch disc 11 by the operating spindle 2 is effected by means of a rectangular member 12, disengagement and engagement of the clutch discs 10 and 11 being effected by the biasing action of the spring 13.

FIG. 4 shows the slide rail 8 displaced in front of the operating spindle 2 but not yet coupled to the chuck 7. The clutch discs 10 and 11 do not engage one another, the spring 13 is compressed so that the clutch disc 10 is stationary whereas the clutch disc 11 on the other hand rotates with the operating spindle. Both slide rail 8 and guides thereof as well as the clutch 10—13 are only shown schematically in order to have a clearer understanding thereof. It is obvious that all of these components will have a considerably more complex structure in actual practice depending upon the operative accuracy of the rotary machine tool and in accordance with the state of the art.

Figure 5:
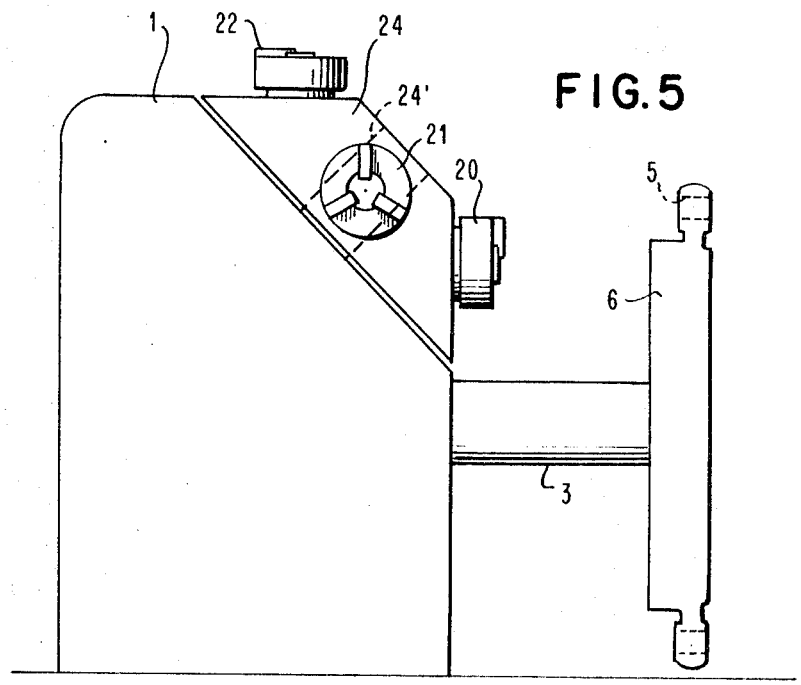
FIG. 5 is a side elevational view of another embodiment of the invention wherein the support member is a rotatable turret carrying four chucks.
Figure 6:
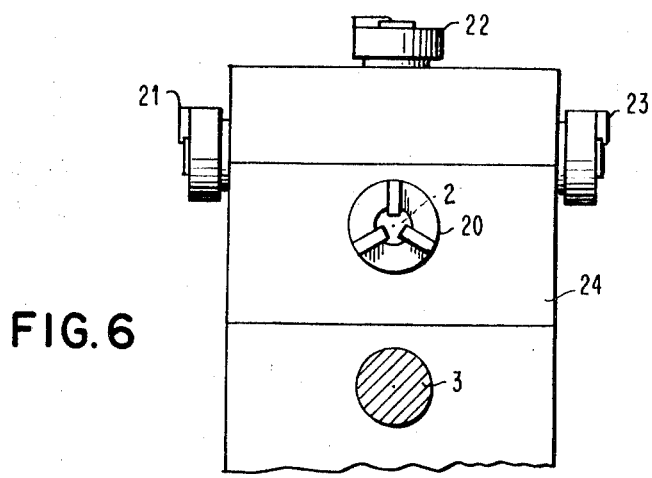
FIG. 6 is a front elevational view of FIG. 5, partly broken away and partly in section, with the tool-revolver omitted.

In FIGS. 5 and 6, the support member carrying the chucks 20—23 is formed as a frustopyramidal turret 24 rotatably disposed on an inclined axis on the machine frame on block 1. It can also be shaped frustoconically or annularly or otherwise. Rotation is effected about a shaft fixed to the machine frame in an annular bearing (not shown). Obviously, provision can be made for fixing the rotary turret in the four operative positions thereof.

When the chuck 20 is coupled to the operating spindle 2, the chucks 21—23 are seated without rotary drive laterally of and above the operating spindle 2. In that position, workpieces which have not as yet been machined can be clamped in the chucks 21—23 or, workpieces which have already been machined can be removed therefrom. This loading and unloading of the chucks 21—23 can be effected during the period in which the workpiece clamped in the chuck 20 is being machined. After the workpieces in the chuck 20 have been completely machined, the chuck 20 is uncoupled from the operating spindle 2 and the turret 24 is turned through an angle of 90° or 100°. Then a chuck in which a raw or unmachined workpiece is clamped is brought in front of the operating spindle 2 and is coupled therewith, whereupon the tool revolver 6 is placed in operative position for machining the workpiece in the newly positioned chuck. The finished workpiece is removed from the chuck 20 and the latter is then loaded with a new raw workpiece.

Obviously the invention of this application is not limited to the embodiment of the supporting slide 8 shown in FIGS. 2—4 or the rotary turret 24 shown in FIGS. 5 and 6, but rather, these components can have different constructions.

The invention is not restricted to only two or four clamping devices that are able to be coupled to the operating spindle 2. For turning down workpieces of relatively medium and large dimensions for short periods of time it can be advantageous to provide a relatively large quantity of chucks, mandrels and the like for being loaded with the workpieces or for being given another preparatory manipulation.

The advantages of equipping, in accordance with the present invention, rotary machine tools with displaceable exchangeable chucks have a special significance for the revolver rotary machine tools built by the assignee of the instant application having a multiarmed tool revolver built into the machine tool with an operating spindle, because these machines afford a relatively limited accessibility to the workpiece coupled to the operating spindle. In addition thereto, relatively medium and large workpieces are of themselves also difficult to manipulate.

We claim:

1. A rotary machine tool comprising a machine frame, a rotary operating spindle mounted in said frame, at least two clamping devices displaceable in a direction transverse to said operating spindle to respective positions wherein one of said clamping devices is connectable to said operating spindle for rotating therewith and the other of said clamping devices is accessible for alternatively clamping therein a workpiece to be machined and removing therefrom a workpiece previously machined, a turret shaft mounted in said machine frame and extending substantially parallel to said operating spindle, and a tool turret carried by said shaft and holding a tool member engageable with a workpiece clamped in said one clamping device for machining the same.